United States Patent
Denney et al.

(10) Patent No.: US 11,163,776 B2
(45) Date of Patent: Nov. 2, 2021

(54) PRODUCT LIFE CYCLE LINE CONFIGURATION MANAGEMENT SYSTEM USING GRAPH DATA STRUCTURE

(71) Applicant: The Boeing Company, Chicago, IL (US)

(72) Inventors: Timothy A. Denney, Mountlake Terrace, WA (US); Matthew L. Viss, Seattle, WA (US); Alan Chong, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 29 days.

(21) Appl. No.: 16/744,070

(22) Filed: Jan. 15, 2020

(65) Prior Publication Data

US 2021/0216543 A1   Jul. 15, 2021

(51) Int. Cl.
  *G06F 16/2457*  (2019.01)
  *G06F 16/901*  (2019.01)
  *G06F 16/28*  (2019.01)
  *G05B 19/042*  (2006.01)
  *G06F 16/22*  (2019.01)

(52) U.S. Cl.
  CPC ..... *G06F 16/2457* (2019.01); *G05B 19/0428* (2013.01); *G06F 16/2246* (2019.01); *G06F 16/284* (2019.01); *G06F 16/9024* (2019.01)

(58) Field of Classification Search
  CPC .......... G06F 16/2457; G06F 16/284; G06F 16/0428; G06F 16/2246; G06F 16/9024
  USPC ..................................................... 707/722
  See application file for complete search history.

(56) References Cited

U.S. PATENT DOCUMENTS

| | | |
|---|---|---|
| 8,572,129 B1 | 10/2013 | Lee et al. |
| 2003/0236577 A1* | 12/2003 | Clinton ............... G06F 8/51 700/10 |
| 2015/0331675 A1* | 11/2015 | De Magalhaes ........ G06F 8/35 717/104 |
| 2019/0220546 A1* | 7/2019 | Cohen .............. G06F 16/254 |

(Continued)

OTHER PUBLICATIONS

Saperstein et al.: "Oracle® Flow Manufacturing User's Guide, Release 11i", (Feb. 2001, Part No. A69396-02, Oracle Corporation) (Year: 2001).*

(Continued)

*Primary Examiner* — Kuen S Lu
(74) *Attorney, Agent, or Firm* — Alleman Hall Creasman & Tuttle LLP

(57) ABSTRACT

A product life cycle management system for use in manufacturing a customizable manufactured article using one of a plurality of manufacturing line configurations is described. A graph data structure is stored in memory, including a plurality of connected nodes including one or more applicability group nodes for applicability groups representing the manufacturing line configurations and object nodes for objects representing components used in the line configurations, the object nodes being connected to the one or more corresponding applicability group nodes to thereby encode in the graph data structure the manufacturing line configurations with which each object is related. A manufacturing-related query from a user is performed on the graph data structure, and one or more object-applicability group relationships are determined based on the manufacturing-related query.

20 Claims, 12 Drawing Sheets

(56) References Cited

U.S. PATENT DOCUMENTS

2019/0347584 A1    11/2019  Lamkin et al.
2019/0354526 A1*   11/2019  Roth ..................... G06F 16/278

OTHER PUBLICATIONS

Dobson et al.: "Oracle® Product Configurator User's Guide", (Release Mar. 11, 1998) (Year: 1998).*
Simmons et al.: "Oracle® Complex Maintenance, Repair, and Overhaul Process Guide", (Release 12.2 Part No. E49035-06 Sep. 2017) (Year: 2017).*
Joe Depeau: "Graphs in Automotive and Manufacturing: Unlock New Value from Your Data", Neo4j, May 27, 2020 (Year: 2020).*
"How to Map Relational Data to a Graph DataBase in Four Steps," Tibco.com, Available Online at https://www.tibco.com/resources/solution-brief/how-map-relational-data-graph-database-four-steps, Mar. 16, 2018, 1 page.
Yang, S, "How to Map Relational Data to a Graph DB in Four Steps," TIBCO Software Inc., Mar. 15, 2018, 5 pages.

* cited by examiner

PRODUCT LIFE CYCLE LINE CONFIGURATION MANAGEMENT SYSTEM USING GRAPH DATA STRUCTURE

FIELD

The subject disclosure relates to product life cycle management systems and methods, and in particular the control and maintenance of inventory and manufacturing line configurations.

BACKGROUND

A product life cycle management system is a type of enterprise system that can be used to design, develop, manage inventory, manufacture, market, maintain, and eventually decommission articles from the stream of commerce. The product life cycle management system uses a variety of data models to represent a product during the lifecycle. One of these data models, referred to as a line configuration, specifies the build plans, manufacturing processes, and manufacturing assemblies that are associated with each manufacturing line configuration. For products that are customizable, such as aircraft, trains, automobiles and a myriad of other high-value products, each variation of the product typically is defined by a separate line configuration. For such products, these line configurations may change on demand with customization of components and assemblies based on customer preferences. For example, in especially complex line configurations such as for aircraft, there may be thousands of variations among millions of components and assemblies. The control and maintenance of such complex manufacturing line configurations for highly variable and complex products presents significant challenges in modern product lifecycle management systems.

As one example of these challenges, line configuration data models of conventional product life cycle management systems can consume extreme computational resources to sort, filter, or perform other operations upon, due to the extremely large size and variability of these models. For example, in some systems, line configuration data is stored in relational data storage models, which are only linked logically by logical expressions called foreign keys. When filtering occurs, these logical expressions join together all the options for a particular parameter, and perform evaluations to determine the validity of relationships. A search for related records on such a relational data storage model requires lookups on the entire target table, which as the target table grows, becomes very inefficient and expensive, especially since the complexity of the search process grows exponentially with the growth of the target table. When the target table becomes too large, as can occur in the case of line configurations for aircraft with millions of components having many thousands of variations, it ultimately becomes extremely computationally intensive, to the point of being unfeasible using conventional computing hardware, to use the target table.

SUMMARY

To address the above issues, according to one aspect of the subject disclosure, a method is provided for managing a product life cycle of a customizable manufactured article using one of a plurality of manufacturing line configurations. In this aspect, the method includes receiving a manufacturing-related query from a user. The method further includes performing the manufacturing-related query on a graph data structure including a plurality of connected nodes, the connected nodes including one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related. The method further includes determining one or more object-applicability group relationships based on the manufacturing-related query. The method further includes returning a response to the manufacturing-related query based on the one or more object-applicability group relationships.

Another aspect of the subject disclosure relates to a product life cycle management system for use in manufacturing a customizable manufactured article using one of a plurality of manufacturing line configurations, the system comprising: a processor configured to: store a graph data structure in memory, the graph data structure including a plurality of connected nodes, the connected nodes including one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related; receive a manufacturing-related query from a user; perform the manufacturing-related query on the graph data structure; determine one or more object-applicability group relationships based on the manufacturing-related query; and return a response to the manufacturing-related query based on the one or more object-applicability group relationships.

Yet another aspect of the subject disclosure relates to a method for managing a product life cycle of a customizable manufactured article using one of a plurality of manufacturing line configurations. The method in this aspect includes receiving a manufacturing-related query from a user. The method further includes performing the manufacturing-related query on a graph data structure including a plurality of connected nodes, the connected nodes including one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related. The method further includes determining one or more object-applicability group relationships based on the manufacturing-related query. The method further includes returning a response to the manufacturing-related query based on the one or more object-applicability group relationships. The method further includes manufacturing the manufactured article based on the returned responses.

The features, functions, and advantages that have been discussed can be achieved independently in various embodiments or may be combined in yet other embodiments further details of which can be seen with reference to the following description and drawings.

DETAILED DESCRIPTION

In view of the considerations discussed above, systems and methods are provided to efficiently perform manufacturing-related queries for effective line configuration management.

Figure 1:
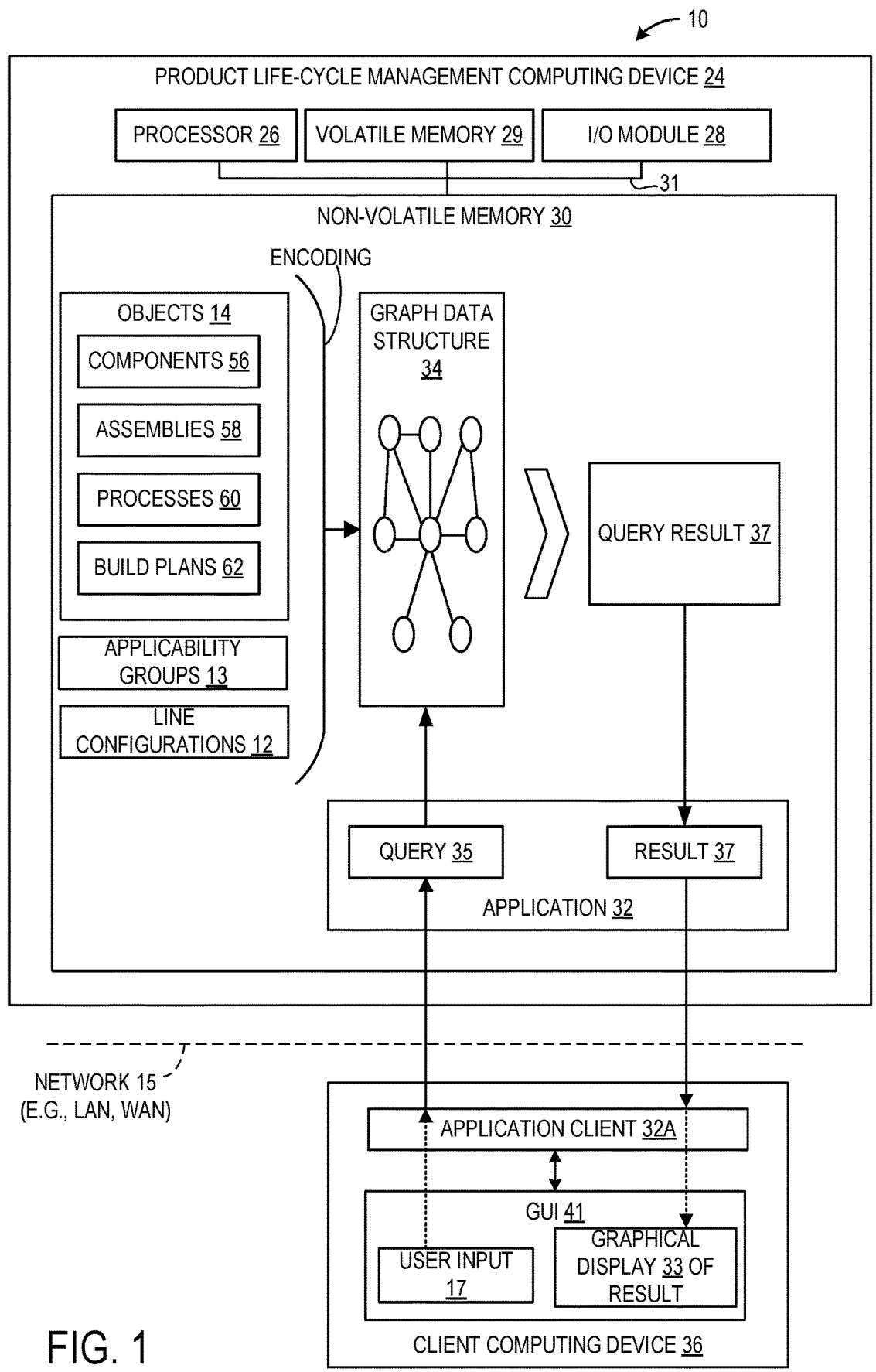
FIG. 1 shows an illustration depicting a product life cycle management system according to an example embodiment of the subject disclosure.

Referring to FIG. 1, a product life cycle management system 10 is provided for use in manufacturing a customizable manufactured article using one of a plurality of manufacturing line configurations 12. The manufacturing line configurations 12 are structured and grouped into a plurality of applicability groups 13. The system 10 comprises plurality of manufacturing assembly line configurations 12, each comprising a plurality of objects 14. The system 10 comprises a product life cycle management computing device 24 comprising a processor 26, an input/output module 28, volatile memory 29, and non-volatile memory 30 storing an application 32 and a graph data structure 34. A bus 31 can operatively couple the processor 26, the input/output module 28, and the volatile memory 29 to the non-volatile memory 30. Although the graph data structure 34 is depicted as hosted at one computing device 24, it will be appreciated that this graph data structure 34 can alternatively be hosted across a plurality of computing devices to which the computing device 24 is communicatively coupled via a network 15, including a client computing device 36 operatively coupled to the product life cycle management computing device 24. In some examples, the network 15 can take the form of a local area network (LAN), wide area network (WAN), wired network, wireless network, personal area network, or a combination thereof, and can include the Internet. The graph data structure 34 can be instantiated as a graph database hosted at a product life cycle management server 24.

The system 10 comprises a processor 26 configured to store the graph data structure 34 in non-volatile memory 30 that retains instructions stored data even in the absence of externally applied power, such as FLASH memory, a hard disk, read only memory (ROM), electrically erasable programmable memory (EEPROM), etc. The instructions include one or more programs, including application 32, and data used by such programs sufficient to perform the operations described herein. The processor 26 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The system 10 further includes volatile memory 29 such as random access memory (RAM), static random access memory (SRAM), dynamic random access memory (DRAM), etc., which temporarily stores data only for so long as power is applied during execution of programs.

In one example, a user operating a client computing device 36 can send a manufacturing-related query 35 to the product life cycle management computing device 24. As described further with reference to FIGS. 7A-E, the manufacturing-related query 35 may include a query asking which lines an object is valid for, a query asking whether an object is valid for a specific line or a specific number of lines, or a query requesting all build plans that are valid for a given line, as just a few of many possible examples. The processor 26 of the product life cycle management computing device 24 is configured to receive the manufacturing-related query 35 from a user, execute a query application 32 to perform the manufacturing-related query 35 on the graph data structure 34, determine one or more object-applicability group relationships based on the manufacturing-related query 35, and then return a response 37 (query results) to the manufacturing-related query 35 based on the one or more object-applicability group relationships. As described further with reference to FIGS. 7A-E, the query results may include a response stating that an object is valid for one or more lines, a response stating that an object is not valid for one or more lines, a response stating that an object is not valid for one set of lines, but valid for another set of lines, or a response listing all the build plans that are valid for a queried line, as just a few of many possible examples. A manufactured article can be subsequently manufactured based on the returned response 37 (query results).

The client computing device 36 can execute an application client 32A to send a query 35 to the product life cycle management computing device 24 upon detecting a user input 17, and subsequently receive the query results 37 from the product life cycle management computing device 24. The application client 32A can be coupled to a graphical user interface 41 of the client computing device 36 to display a graphical display 33 of the results based on the received query results 37.

A component 56 is a data representation of a constituent part of the manufactured article that is manufactured using one of a plurality of manufacturing line configurations 12. A manufacturing assembly 58 is a data representation of a collection or assemblage of manufacturing parts or components 56. A manufacturing process 60 is a data representation of a method or an algorithm to be used to manufacture the manufactured article in a given manufacturing line configuration 12. The plurality of manufacturing line configurations 12 can be customized variations of the customizable manufactured article.

A build plan 62 is a data representation that describes the integration of technical artifacts that are the basis for fabrication, assembly, installation, manufacturing resources (tools, transport, etc.), flow of parts, execution metrics, inspection, test, resource states, job states, and history of the manufactured article throughout the product life cycle. The build plan 62 is a highly integrated process with tightly integrated dependencies. Although many components 56 of the manufactured article are static, other objects 14 associated with manufactured article are customizable based upon a customer order. For example, when the customizable manufactured article is an aircraft, customizations can include external paint, seat configurations, internal materials, lavatory options, and/or fixtures, as a few examples. The product life cycle management system 10 is configured to manage such a combination of fixed processes with highly variable processes.

Figure 2:
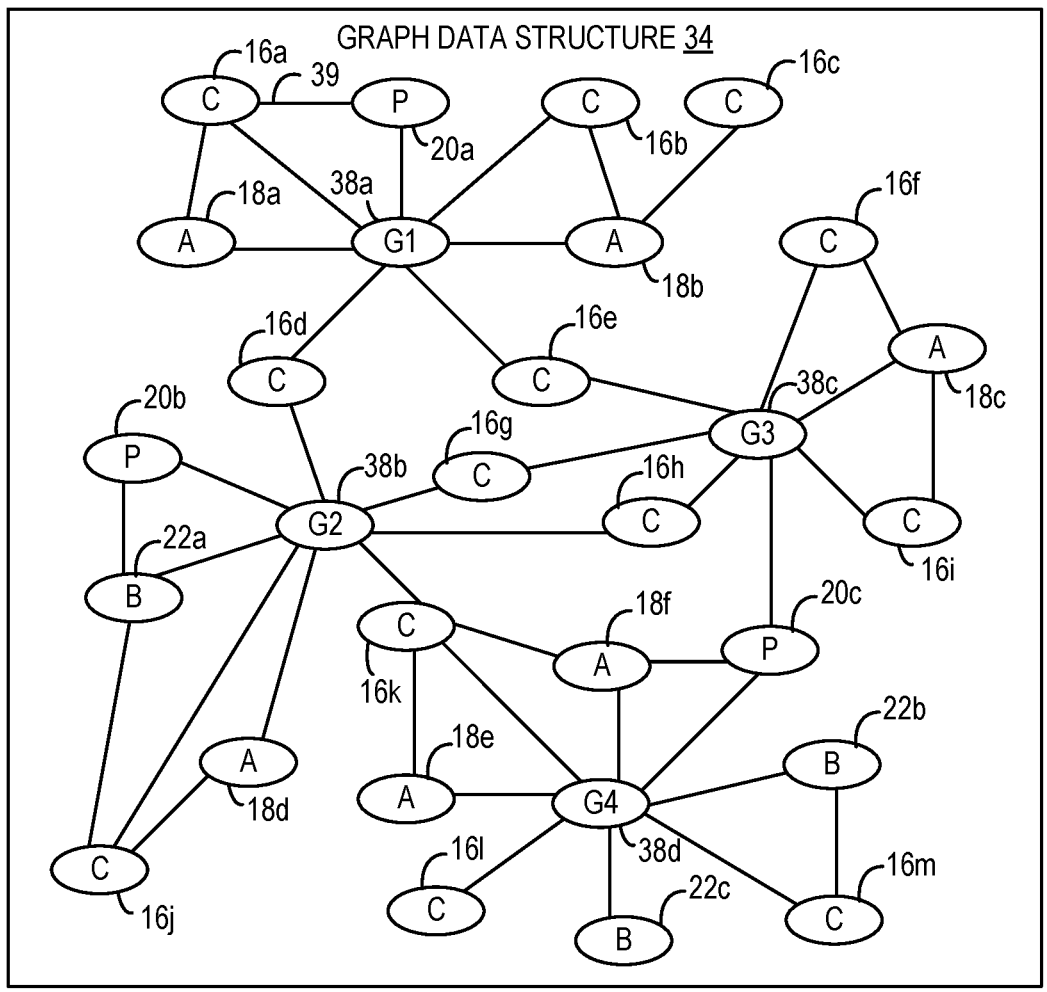
FIG. 2 shows an illustration depicting a graph data structure according to an example embodiment of the subject disclosure.

Referring to FIG. 2, the graph data structure 34 includes a plurality of connected nodes 16a-m, 18a-f, 20a-c, 22a-c, 38a-d. The connected nodes 16a-m, 18a-f, 20a-c, 22a-c, 38a-d include one or more applicability group nodes 38a-d for applicability groups representing the manufacturing line configurations 12 and object nodes 16a-m, 18a-f, 20a-c, 22a-c for objects 14 representing components 56 used in the manufacturing line configurations 12. Each applicability group node 38a, 38b, 38c, 38d can represent a unique manufacturing line configuration 12. The object nodes 16a-m, 18a-f, 20a-c, 22a-c are connected to the one or more corresponding applicability group nodes 38a, 38b, 38c, 38d to thereby encode in the graph data structure 34 the manufacturing line configurations 12 with which each object 14 is related. These objects 14 can further include at least one of manufacturing build plans 62, manufacturing assemblies 58, or manufacturing processes 60. Accordingly, component object nodes 16a-m represent components 56, assembly object modes 18a-f represent manufacturing assemblies 58, process object nodes 20a-c represent manufacturing processes 60, and plan object nodes 22a-c represent manufacturing build plans 62.

Further in reference to FIG. 2, a plurality of edges 39 define or represent connections or relationships between corresponding pairs of nodes in the graph data structure 34. The system 10 uses these relationships to determine the filtering of content. Accordingly, manufacturing-related queries are performed more efficiently, since finding related nodes in a graph data structure is much more efficient than finding related data rows in a relational database model. In this example, component object nodes 16a, 16b, 16d, and 16e, process object node 20a, assembly object nodes 18a and 18b are connected to applicability group node 38a. Component object nodes 16d, 16g, 16j, and 16k, assembly object node 18d, plan object node 22a, and process object node 20b are connected to applicability group node 38b. Component object nodes 16e, 16f, 16g, 16h, and 16i, assembly object node 18c, and process object node 20c are connected to applicability group node 38c. Component object nodes 16l and 16m, plan object nodes 22b and 22c, assembly object nodes 18e and 18f, and process object node 20c are connected to applicability group node 38d.

It will be appreciated that object nodes can be connected to each other. For example, it will be noted that component object node 16j is connected to plan object node 22a, which is connected to process object node 20b. Further, an object node can be connected to more than one applicability group node. For example, it will be noted that component object node 16k is connected to both applicability group node 38b and applicability group node 38d. A multitude of such applicability group nodes, object nodes, and edges can be stored in the graph data structure 34 with the edges connecting the nodes in a complex web of relationships.

In an airplane manufacturing application, the component object node 16k can represent a door handle component, for example, which is valid for two airplane manufacturing line configurations, each manufacturing line configured to manufacture a unique airplane model: one manufacturing line represented by applicability group node 38b and another manufacturing line represented by applicability group node 38d. The door handle component can be part of a door assembly. Accordingly, an edge can connect the component object node 16k with assembly object node 18f for the door assembly. This relationship establishes that the door handle object of component object node 16k is valid for the door assembly of assembly object node 18f.

Figure 3:
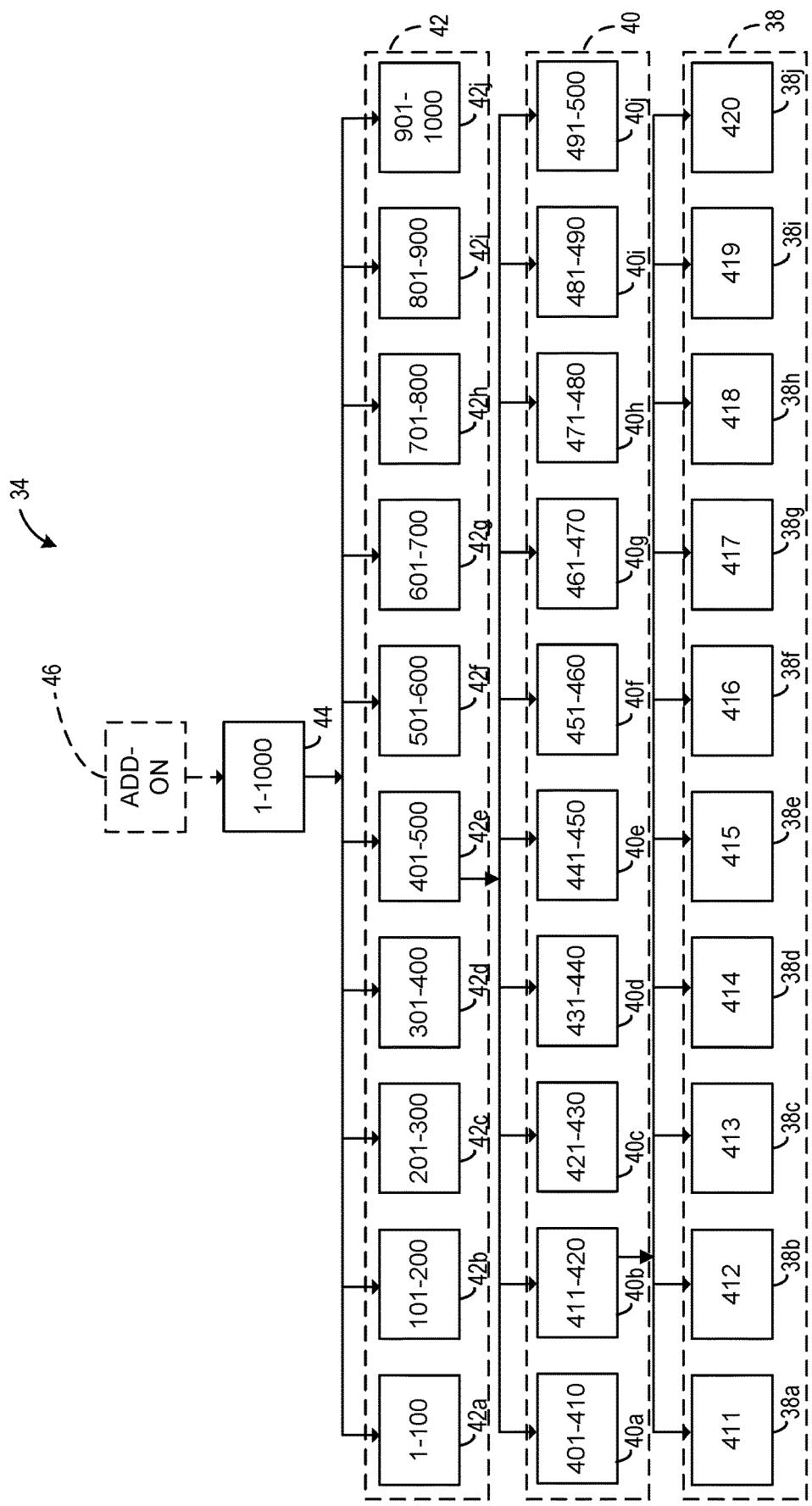
FIG. 3 shows an illustration depicting a hierarchical graph data structure according to an example embodiment of the subject disclosure.

Referring to FIG. 3, the graph data structure 34 can organize the applicability group nodes 38a-j in a hierarchical tree structure. The applicability group nodes 38a-j can be organized in a hierarchical relationship that is traversable via a rooted tree or a nested set model. The applicability group nodes 38a-d can be grouped in span nodes 40a-j, each span node 40a-j connected to a predetermined number of applicability group nodes 38. In this example, each span node 40a-j is connected to ten applicability group nodes 38, so that the applicability group node 38a for group 411, applicability group node 38b for group 412, applicability group node 38c for group 413, applicability group node 38d for group 414, applicability group node 38e for group 415, applicability group node 38f for group 416, applicability group node 38g for group 417, applicability group node 38h for group 418, applicability group node 38i for group 419, and applicability group node 38j for group 420, are connected to span node 40b for applicability groups 411-420. However, it will be appreciated that the number of applicability group nodes 38a-d connected to each span node 40 is not particularly limited, and can be less than ten or greater than ten depending on preferences. Further, the number of applicability group nodes 38 connected to each span node 40 can alternatively vary within the graph data structure 34. For example, one span node 40 can be connected to two applicability group nodes 38, while another span node 40 can be connected to ten applicability group nodes 40.

Although not explicitly shown in FIG. 3, it will be appreciated that span node 40a is connected to applicability group nodes for groups 401-410, span node 40b is connected to applicability group nodes for groups 411-420, span node 40c is connected to applicability group nodes for groups 421-430, span node 40d is connected to applicability group nodes for groups 431-440, span node 40e is connected to applicability group nodes for groups 441-450, span node 40f is connected to applicability group nodes for groups 451-460, span node 40g is connected to applicability group nodes for groups 461-470, span node 40h is connected to applicability group nodes for groups 471-480, span node 40i is connected to applicability group nodes for groups 481-490, and span node 40j is connected to applicability group nodes for groups 491-500.

The span nodes 40 can be grouped in subgroup nodes 42a-j, each subgroup node 42 connected to a predetermined number of span nodes 40. In this example, each subgroup node 42 is connected to ten span nodes 40, so that span node 40a for groups 401-410, span node 40b for groups 411-420, span node 40c for groups 421-430, span node 40d for groups 431-440, span node 40e for groups 441-450, span node 40f for groups 451-460, span node 40g for groups 461-470, span node 40h for groups 471-480, span node 40i for groups 481-490, and span node 40j for groups 491-500 are connected to subgroup node 42e. However, it will be appreciated that the number of span nodes 40 connected to each subgroup node 42 is not particularly limited, and can be less than ten or greater than ten depending on preferences. Further, the number of span nodes 40 connected to each subgroup node 42 can alternatively vary within the graph data structure 34. For example, one subgroup node 42 can be connected to two span nodes 40, while another subgroup node 42 can be connected to ten span nodes 40.

The subgroup nodes 42 are connected to a parent node 44 that is ultimately connected to all the applicability groups 38. Further, an ADDON group node 46 can be connected to the parent node 44 to denote a default configuration behavior as discussed further below with reference to the graph data structure of FIG. 4B and the method 500. However, it will be appreciated that the graph data structure 34 can alternatively omit the parent node 44 and the ADDON group node 46. Although the parent node 44 is connected to a span of groups 1 to 1000 in this depiction, it will be appreciated the number of applicability groups connected to the parent node 44 is not particularly limited, and can be 10,000, 100,000 or more depending on the scale of the product life cycle management system and the corresponding size of the graph data structure 34.

It will be appreciated that the number of span nodes 40 connected to each subgroup node 42 can not necessarily equal to the number of applicability group nodes 38 connected to each span node 40. For example, alternatively, eight span nodes 40 can be connected to each subgroup node 42 while six applicability group nodes 38 can be connected to each span node 40, or six span nodes 40 can be connected to each subgroup node 42 while eight applicability group nodes 38 can be connected to each span node 40. Further, additional layers of node groupings can be implemented depending on the complexity of the graph data structure 34. The parent node 44 can actually only be one of a plurality of other parent nodes that are each connected to a plurality of subgroup nodes, span nodes, and applicability group nodes. These parent nodes can be further grouped together into grandparent nodes, each grandparent node connected to a predetermined number of parent nodes. Additional layers of groupings of nodes can be configured in this manner to accommodate the size and complexity of the graph data structure 34. These additional layers can replicate the structure of the layers of applicability group nodes 38, span nodes 40, and subgroup nodes 42 depicted in FIG. 3, such that these additional layers respect a structured designation such as division by a base 10, base 12, base 14, or another base. For example, to structure 10,000 applicability groups, an additional layer can feature ten additional nodes, each node connected to 1,000 applicability groups: a first additional node connected to groups 1-1000, a second additional node connected to groups 1001-2000, a third additional node connected to groups 2001-3000, a fourth additional node connected to groups 3001-4000, a fifth additional node connected to groups 4001-5000, a sixth additional node connected to groups 5001-6000, a seventh additional node connected to groups 6001-7000, an eighth additional node connected to groups 7001-8000, a ninth additional node connected to groups 8001-9000, and a tenth additional node connected to groups 9001-10000, for example.

Figure 4A:
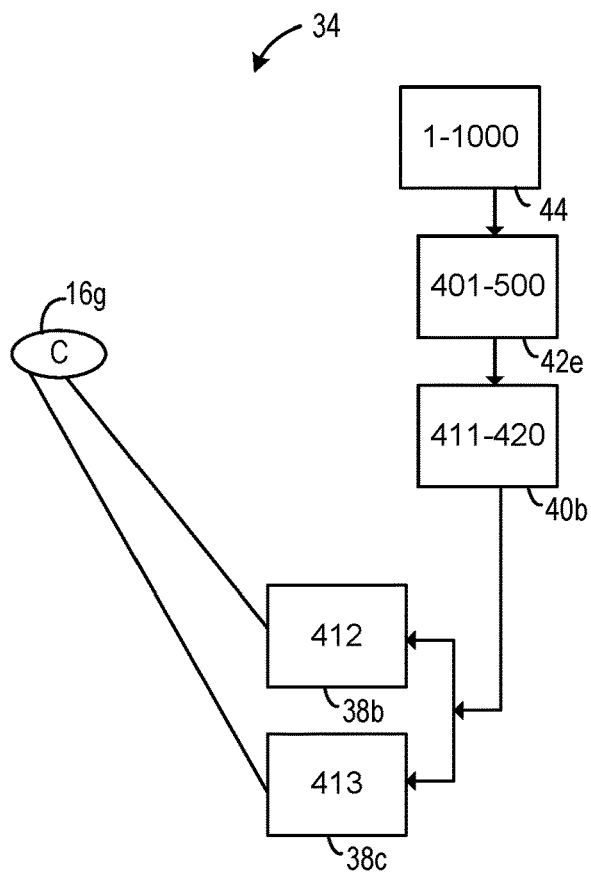
FIG. 4A shows a diagram depicting a first exemplary object node connected to various applicability group nodes via edges in the graph data structure of FIG. 1.

Referring to FIG. 4A, a diagram is provided depicting an exemplary component object node 16g connected to applicability group nodes 38b and 38c via edges in the graph data structure 34 of FIG. 1. In this example, component object node 16g is valid for groups 412 and 413. As a result, component object node 16g is connected to applicability group nodes 38b and 38c.

Figure 4B:
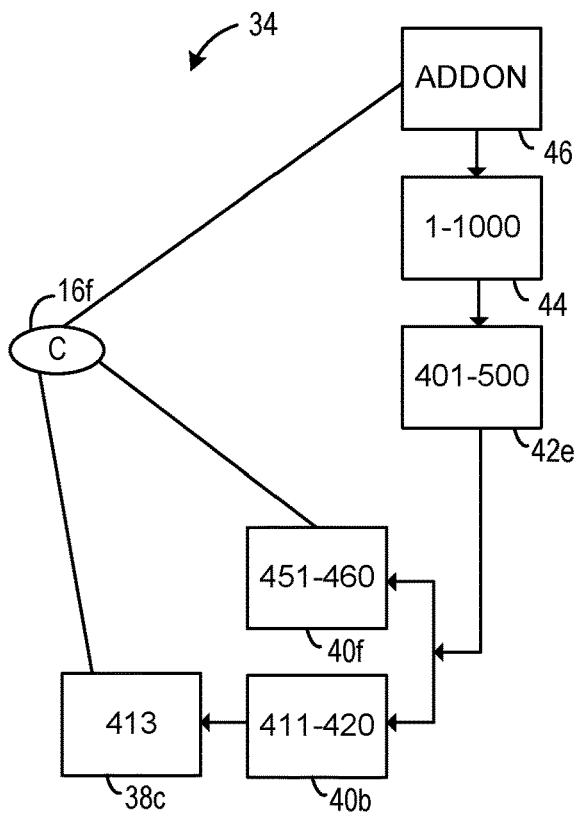
FIG. 4B shows a diagram depicting a second exemplary object node connected to various applicability group nodes, including an ADDON group node, via edges in the graph data structure of FIG. 1.

Referring to FIG. 4B, a diagram is provided depicting an exemplary component object node 16f connected to applicability group nodes for groups 413 and 451-1000, and an ADDON group node 46 via edges in the graph data structure of FIG. 1. In this example, component object node 16f is valid for groups 413 and 451-1000. As a result, component object node 16f is connected to the ADDON group node 46, applicability group node 38c, and span node 40f. It will be appreciated in FIGS. 4A and 4B that an object can be assigned to multiple applicability groups as long as the multiple applicability groups are not a subset of each other. Accordingly, this structure minimizes the number of relationships that need to exist on a given node. As the number of relationships on a node incurs a computational cost and memory cost, this structure allows wide ranges of line numbers to be expressed with only one relationship, especially when the ranges of line numbers are continuous.

Figure 5:
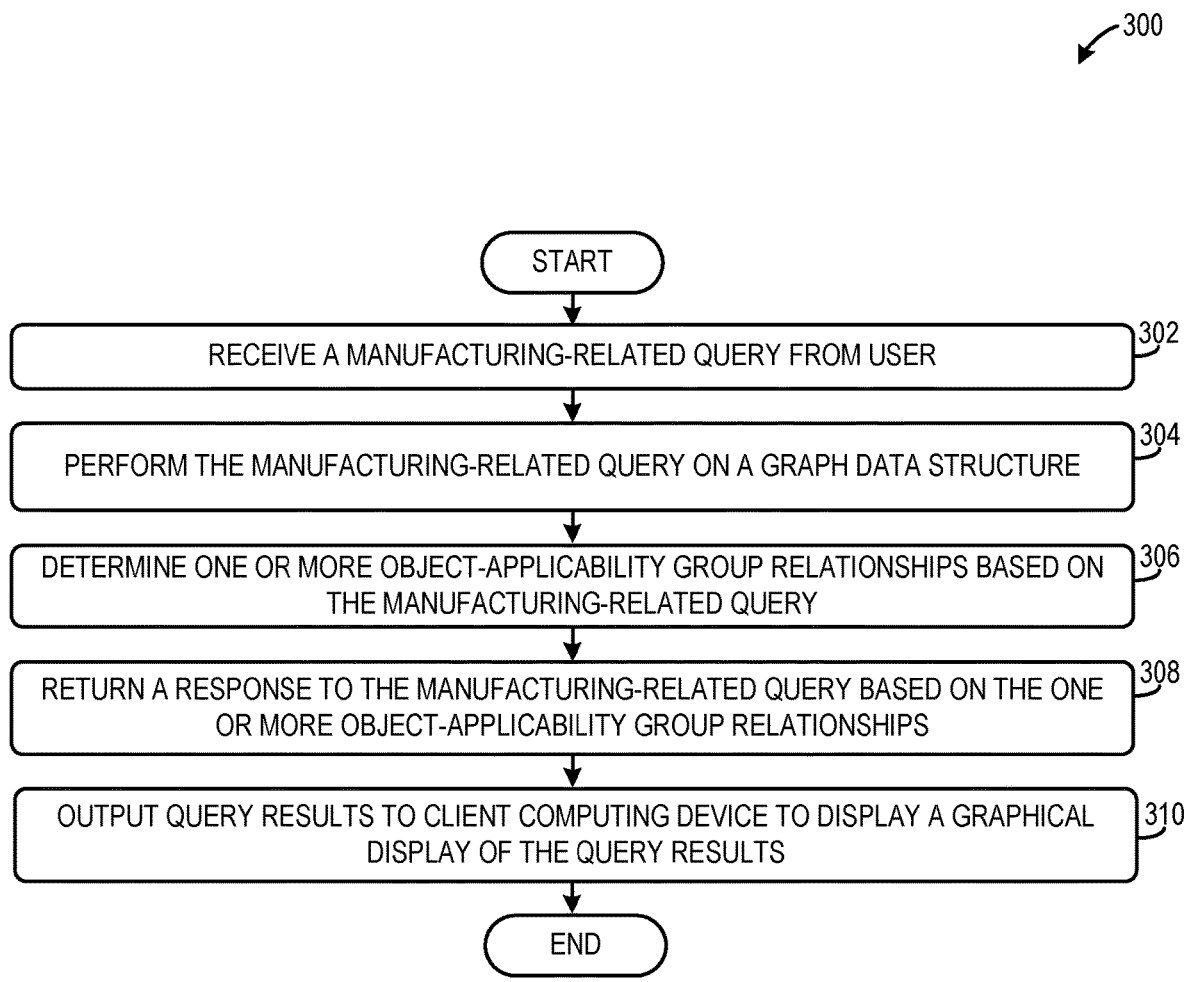
FIG. 5 shows an illustration of operations of a first method performed according to an example embodiment of the subject disclosure.

FIG. 5 illustrates a flow chart of an example configuration of a first method 300 according to one aspect of the subject disclosure. The following description of method 300 is provided with reference to the software and hardware components described above and shown in FIGS. 1-4B. It will be appreciated that method 300 also can be performed in other contexts using other suitable hardware and software components. The first method 300 is a manufacturing method for manufacturing a manufactured article by performing a manufacturing-related query on a graph data structure according to the subject disclosure.

At step 302, a manufacturing-related query is received from a user device by a system comprising a processor. The manufacturing-related query is associated with a customizable manufactured article that utilizes one or a plurality of manufacturing line configurations. At step 304, the manufacturing-related query is performed on a graph data structure including a plurality of connected nodes. At step 306, one or more object-applicability group relationships are determined based on the manufacturing-related query. At step 308, responses to the manufacturing-related query are returned as query results based on the one or more object-applicability group relationships. At step 310, the query results are outputted to a client computing device to display a graphical display of the query results. In some embodiments, further downstream processing can be performed on the received query results to manufacture the manufactured article based on the query results.

Figure 6A:
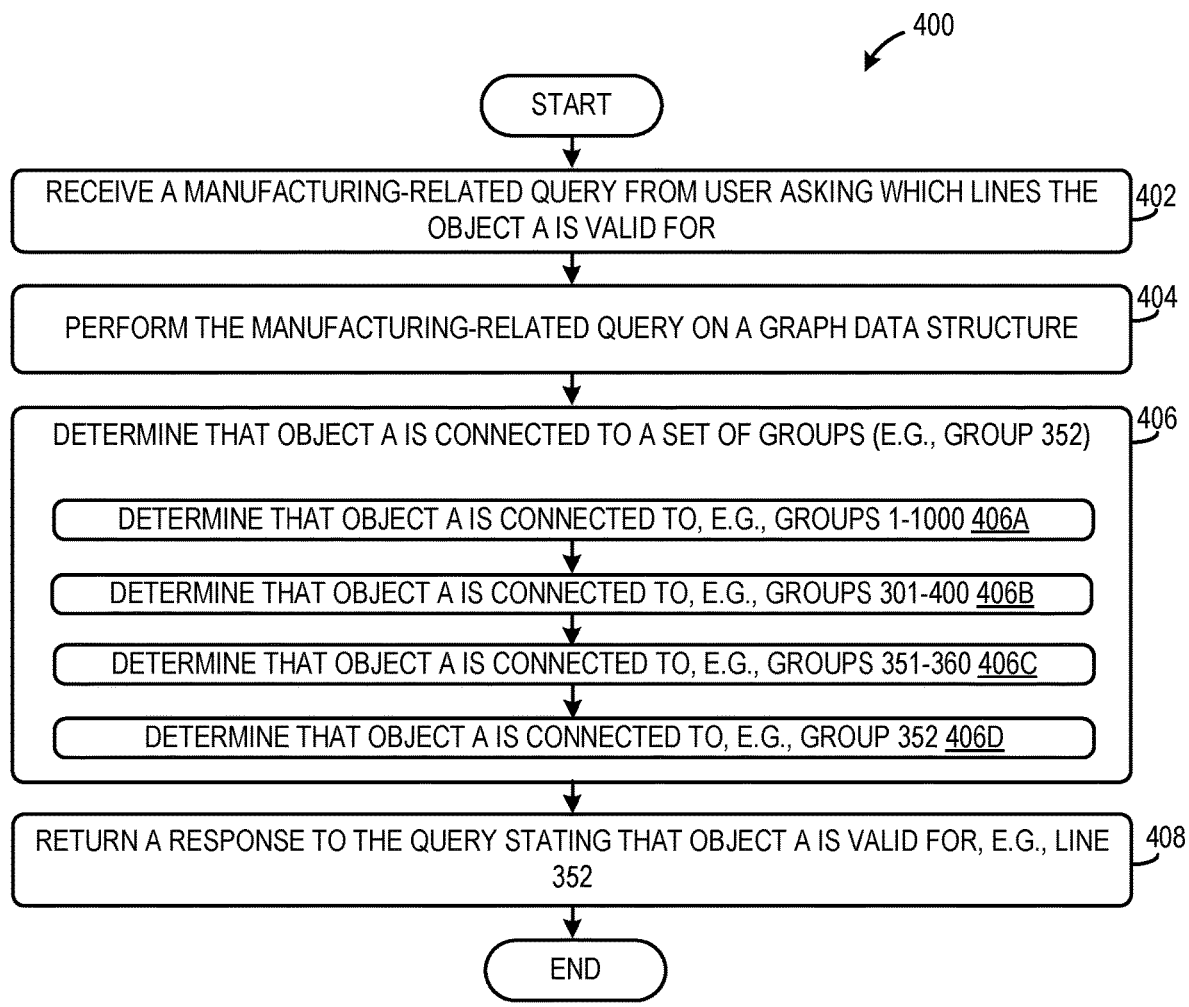
FIG. 6A shows an illustration of operations of a second method performed according to an example embodiment of the subject disclosure.

FIG. 6A illustrates a flow chart of an example configuration of a second method 400 according to one aspect of the subject disclosure. The following description of method 400 is provided with reference to the software and hardware components described above and shown in FIGS. 1-4A. It will be appreciated that method 400 also can be performed in other contexts using other suitable hardware and software components. The second method 400 is for returning all valid applicability groups for a given object. It will be appreciated that the number of applicability group nodes connected to each span node and the number of span nodes connected to each subgroup node can alternatively vary within the graph data structure, and the numbers are not particularly limited, being less than ten or greater than ten depending on preferences. Further, the number of layers of node groupings in the graph data structure 34 is not particularly limited to the number described in FIG. 3, and additional layers can be added depending on the size and complexity of the graph data structure.

Figure 7A:
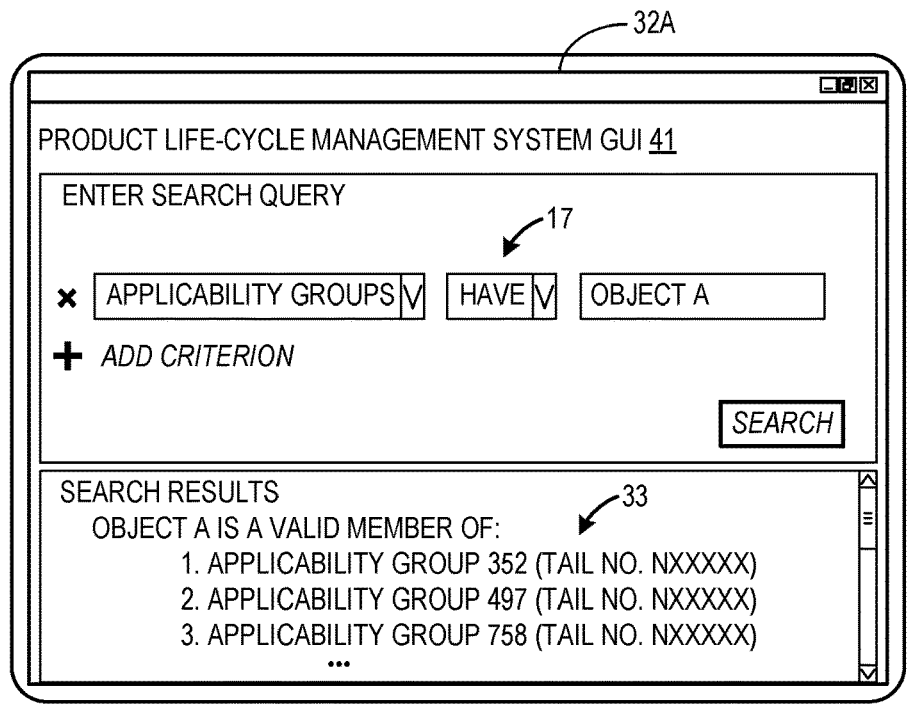
FIG. 7A shows an illustration of an exemplary graphical display of a query and query results associated with the second method performed according to an example embodiment of the subject disclosure.

At step 402, a manufacturing-related query is received from a user asking which lines the object A is valid for, as illustrated in FIG. 7A. At step 404, the manufacturing-related query is performed on the graph data structure. At step 406, it is determined that object A is connected to the applicability group node for group 352. At step 408, a response to the query is returned stating that object A is valid for line 352, as illustrated in FIG. 7A.

The evaluation of the connections between object A and the various subgroup nodes, span nodes, and applicability group nodes can be performed in the following sequence. At step 406A, the connection with the parent node is evaluated, and it is determined that object A is connected to groups 1-1000. At step 406B, while the connections with the subgroup nodes are evaluated, it is determined that object A is connected to groups 301-400. At step 406C, while the connections with the span nodes are evaluated, it is determined that object A is connected to groups 351-360. At step 406D, while the connections with each applicability group connected to the span node for groups 351-360 are evaluated, it is determined that object A is connected to group 352.

Figure 6B:
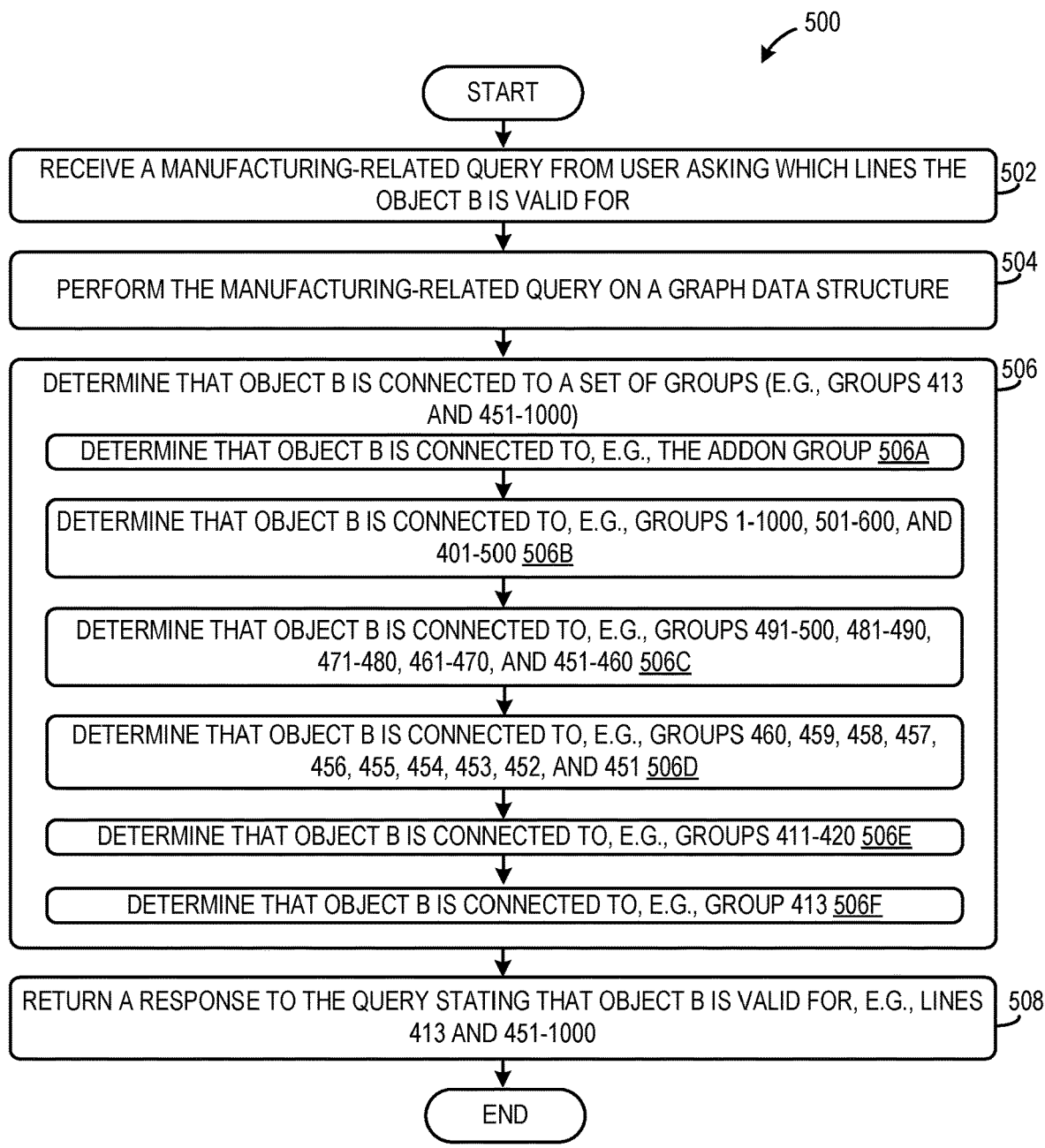
FIG. 6B shows an illustration of operations of a third method performed according to an example embodiment of the subject disclosure.

FIG. 6B illustrates a flow chart of an example configuration of a third method 500 according to one aspect of the subject disclosure. The following description of method 500 is provided with reference to the software and hardware components described above and shown in FIGS. 1-4B. It will be appreciated that method 500 also can be performed in other contexts using other suitable hardware and software components. The third method 500 is for returning all valid applicability groups for a given object using an ADDON group as discussed with reference to FIG. 4B. Objects can be connected to the ADDON group to denote a default configuration behavior to minimize the overhead in a mixed manufacturing environment through groups of configuration in relation to product definition. This ADDON group is an applicability group that represents an open-ended set of manufacturing line configurations. In this example, when an object node is connected to the ADDON group node, this denotes that the object is valid for a contiguous block of applicability groups from the highest numbered applicability group in the graph data structure to a lower numbered applicability group in the same graph data structure.

Figure 7B:
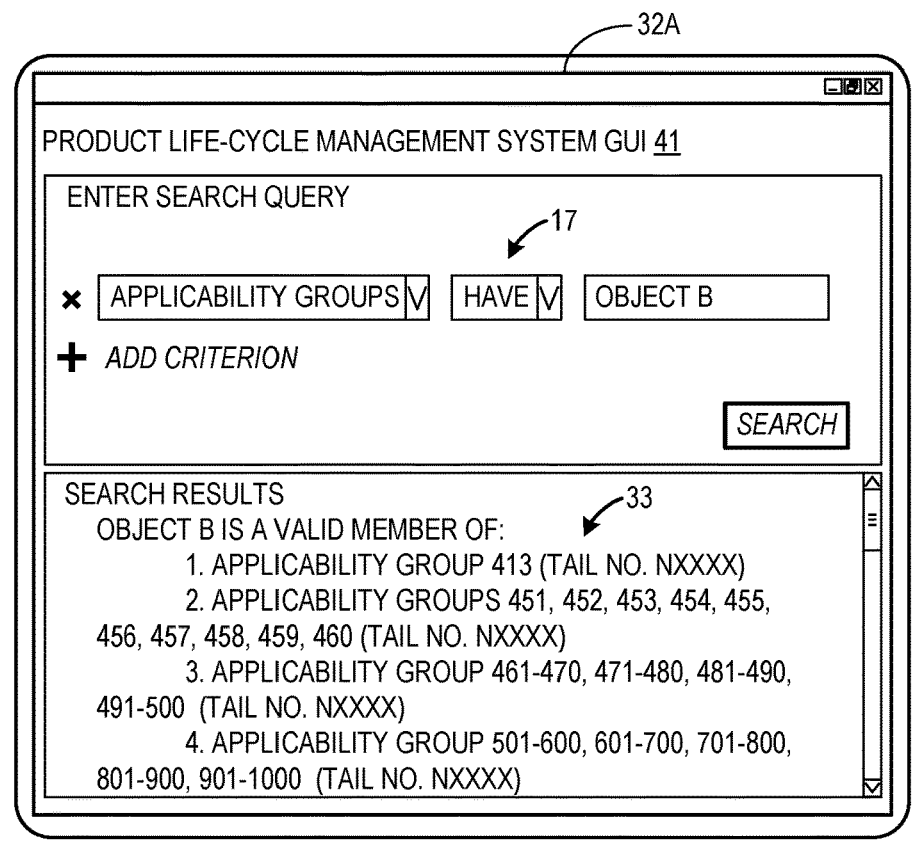
FIG. 7B shows an illustration of an exemplary graphical display of a query and query results associated with the third method performed according to an example embodiment of the subject disclosure.

At step 502, a manufacturing-related query is received from a user asking which lines the object B is valid for, as illustrated in FIG. 7B. At step 504, the manufacturing-related query is performed on the graph data structure. At step 506, it is determined that object B is connected to groups 413 and 451-1000. At step 508, a response to the query is returned stating that object B is valid for lines 413 and 451-1000, as illustrated in FIG. 7B.

The evaluation of the connections between object B and the various subgroup nodes, span nodes, and applicability group nodes can be performed in the following sequence. At step 506A, it is determined that object B is connected to the ADDON group. The third method 500 then determines that object B is valid for a contiguous block of applicability groups from group 1000, and subsequently determines at which lower numbered applicability group this contiguous block ends.

At step 506B, evaluating connections with the parent node and subgroup nodes, it is determined that object B is connected to groups 1-1000, 501-600, and 401-500. Therefore, the third method 500 has determined that the contiguous block of valid applicability groups ends at an applicability group numbered between 401 and 500.

At step 506C, evaluating connections with the span nodes, it is determined that object B is connected to groups 491-500, 481-490, 471-480, 461-470, and 451-460. Therefore, the third method 500 has determined that the contiguous block of valid applicability groups ends at an applicability group numbered between 451 and 460.

At step 506D, while evaluating connections with each applicability group connected to the span node for groups 451-460, it is determined that object B is connected to groups 460, 459, 458, 457, 456, 455, 454, 453, 452, and 451. Therefore, the method 500 has determined that the contiguous block of valid applicability groups ends at applicability group 451.

At steps 506E to 506F, the third method 500 performs the query similarly to the second method 400. At step 506E, while evaluating the connections with rest of the span nodes, it is determined that object B is connected to groups 411-420. At step 506F, while evaluating the connections with each applicability group node in the span node for groups 411-420, it is determined that object B is connected to group 413.

Figure 6C:
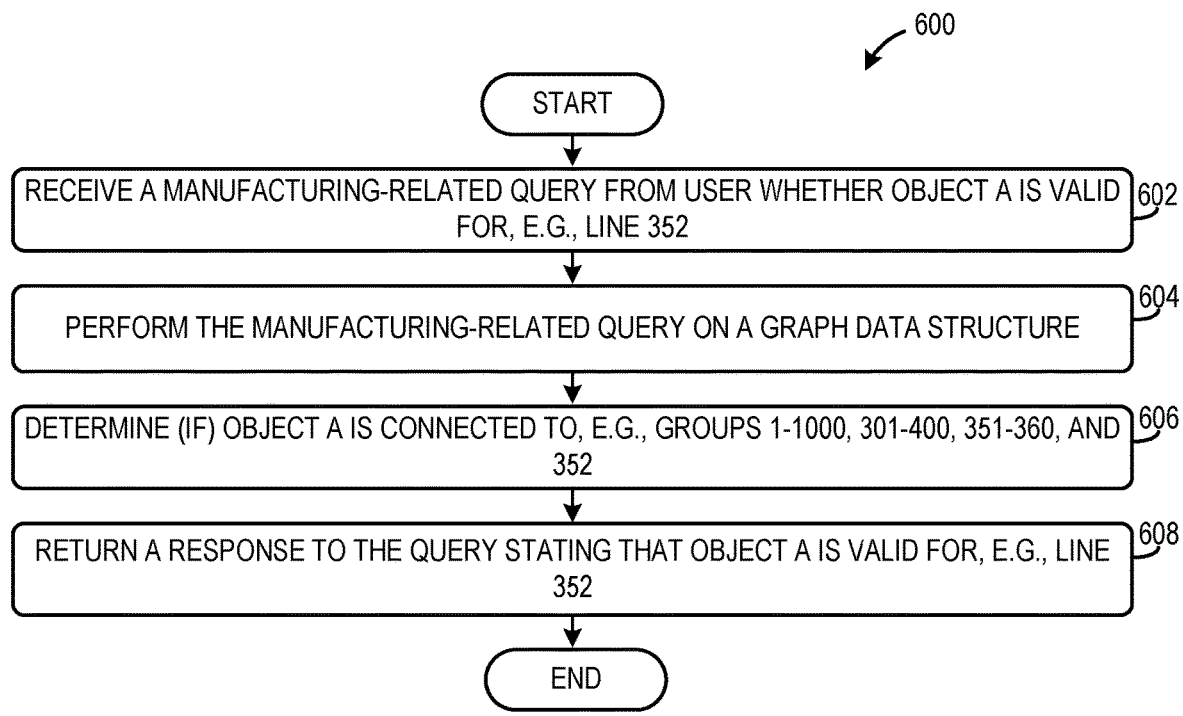
FIG. 6C shows an illustration of operations of a fourth method performed according to an example embodiment of the subject disclosure.

FIG. 6C illustrates a flow chart of an example configuration of a fourth method 600 according to one aspect of the subject disclosure. The following description of method 600 is provided with reference to the software and hardware components described above and shown in FIGS. 1-4B. It will be appreciated that method 600 also can be performed in other contexts using other suitable hardware and software components. The fourth method 600 is for performing a manufacturing-related query for determining whether an object is valid for an applicability group specified by the user.

Figure 7C:
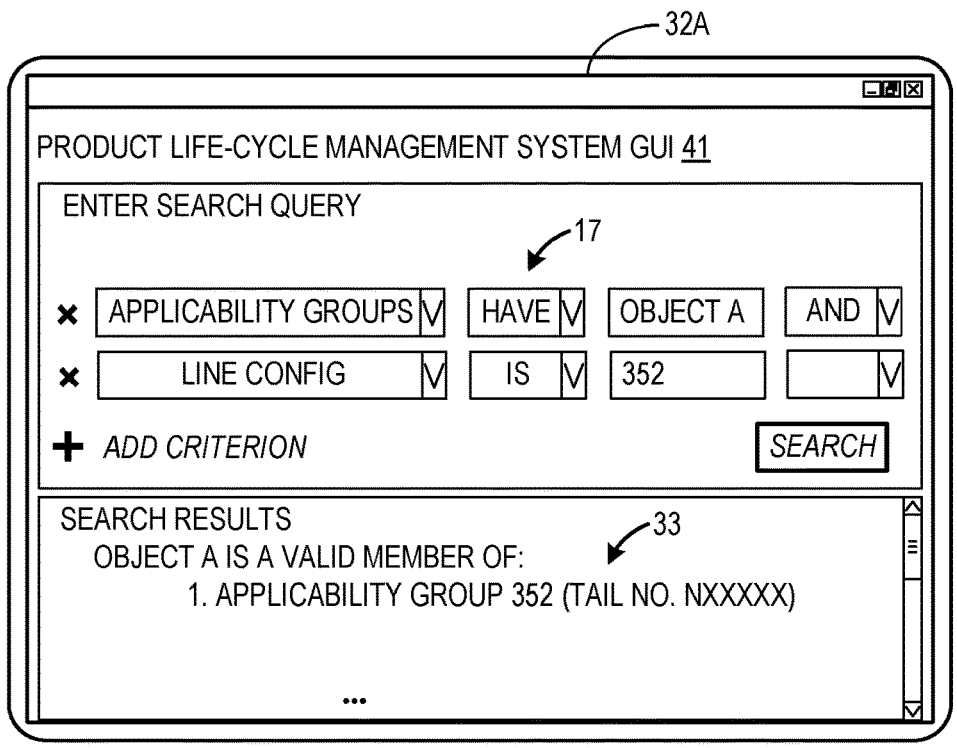
FIG. 7C shows an illustration of an exemplary graphical display of a query and query results associated with the fourth method performed according to an example embodiment of the subject disclosure.

At step 602, a manufacturing-related query is received from a user asking whether object A is valid for line 352, as illustrated in FIG. 7C. At step 604, the manufacturing-related query is performed on the graph data structure. At step 606, it is determined if object A is connected to the parent node (groups 1-1000), the subgroup node for groups 301-400, the span node for groups 351-360, and the applicability group node for group 352. At step 608, a response to the query is returned stating that object A is valid for line 352, as illustrated in FIG. 7C.

Figure 6D:
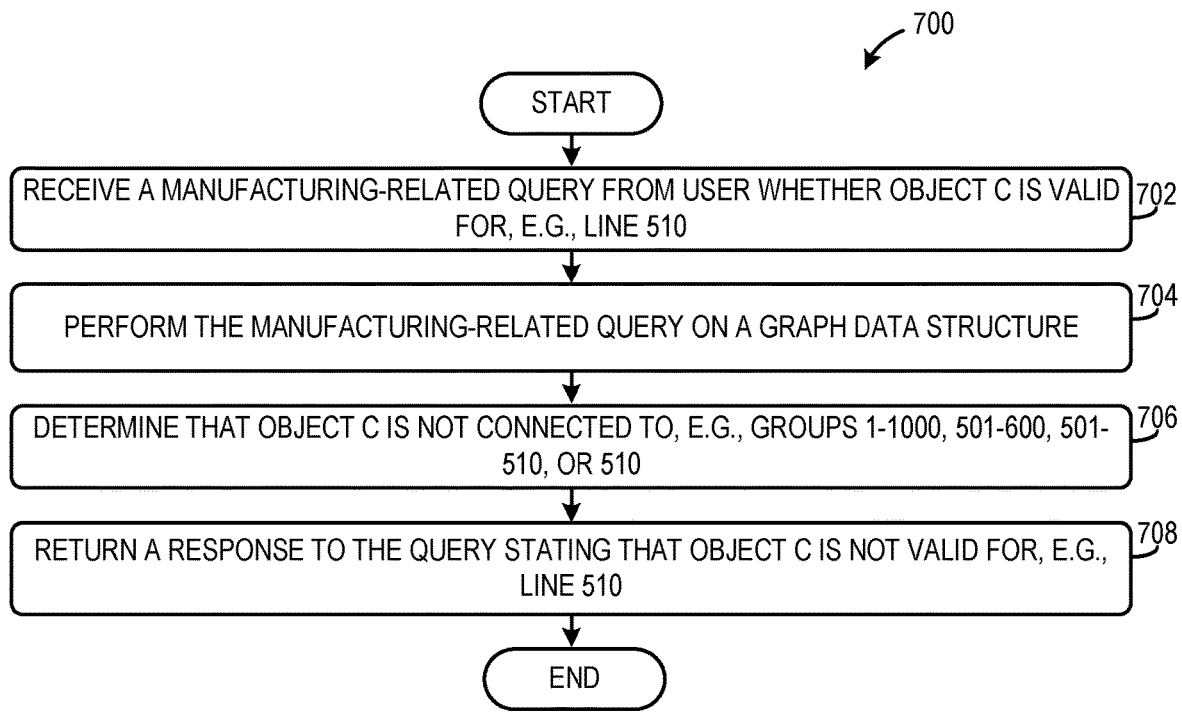
FIG. 6D shows an illustration of operations of a fifth method performed according to an example embodiment of the subject disclosure.

FIG. 6D illustrates a flow chart of an example configuration of a fifth method 700 according to one aspect of the subject disclosure. The following description of method 700 is provided with reference to the software and hardware components described above and shown in FIGS. 1-4B. It will be appreciated that method 700 also can be performed in other contexts using other suitable hardware and software components. The fifth method 700 is for performing a manufacturing-related query for determining whether an object is valid for a line configuration and associated applicability groups specified by the user.

Figure 7D:
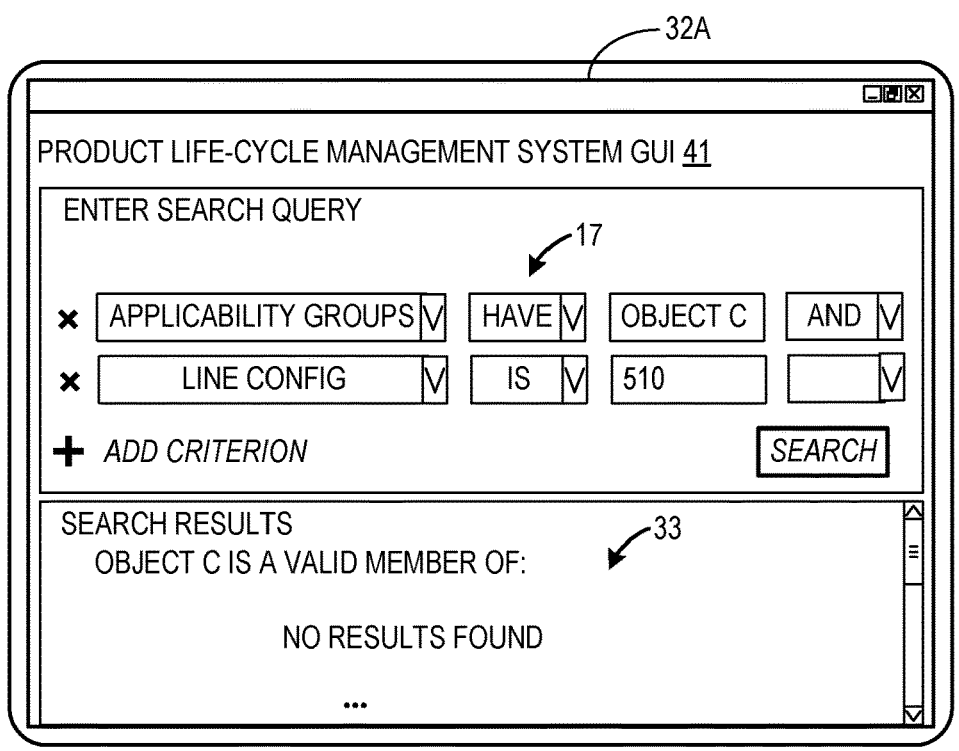
FIG. 7D shows an illustration of an exemplary graphical display of a query and query results associated with the fifth method performed according to an example embodiment of the subject disclosure.

At step 702, a manufacturing-related query is received from a user asking whether object C is valid for line 510, as illustrated in FIG. 7D. At step 704, the manufacturing-related query is performed on the graph data structure. At step 706, it is determined that object A is not connected to the parent node (groups 1-1000), the subgroup node for groups 501-600, the span node for groups 501-510, or the applicability group node for group 510. At step 708, a response to the query is returned stating that object A is not valid for line 510, as illustrated in FIG. 7D.

Figure 6E:
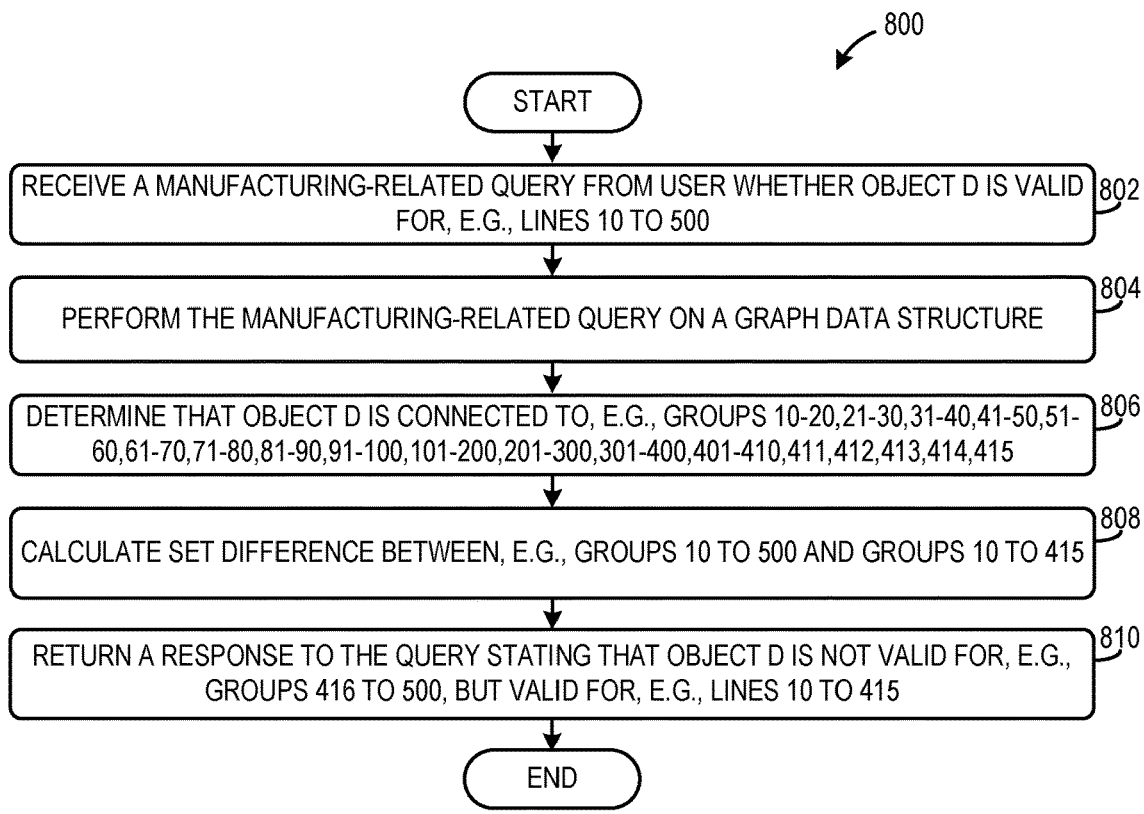
FIG. 6E shows an illustration of operations of a sixth method performed according to an example embodiment of the subject disclosure.

FIG. 6E illustrates a flow chart of an example configuration of a sixth method 800 according to one aspect of the subject disclosure. The following description of method 800 is provided with reference to the software and hardware components described above and shown in FIGS. 1-4B. It will be appreciated that method 800 also can be performed in other contexts using other suitable hardware and software components. The sixth method 800 is for performing a manufacturing-related query for determining whether an object is valid for a range of line configurations and associated applicability groups specified by the user.

Figure 7E:
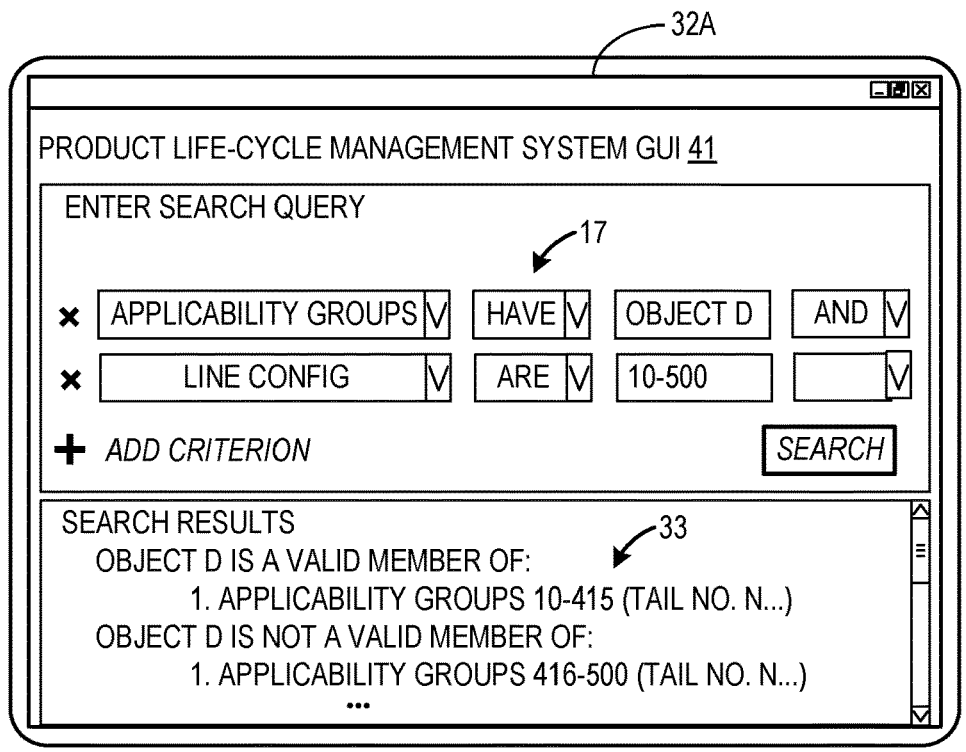
FIG. 7E shows an illustration of an exemplary graphical display of a query and query results associated with the sixth method performed according to an example embodiment of the subject disclosure.

At step 802, a manufacturing-related query is received from a user asking whether object D is valid for lines 10 to 500, as illustrated in FIG. 7E. At step 804, the manufacturing-related query is performed on the graph data structure. At step 806, it is determined that object D is connected to applicability groups 10-20, 21-30, 31-40, 41-50, 51-60, 61-70, 71-80, 81-90, 91-100, 101-200, 201-300, 301-400, 401-410, 411, 412, 413, 414, and 415. At step 808, a set difference is calculated between groups 10 to 500 and groups 10 to 415. At step 810, a response to the query is returned stating that object D is not valid for lines 416 to 500, but valid for lines 10 to 415, as illustrated in FIG. 7E.

Figure 6F:
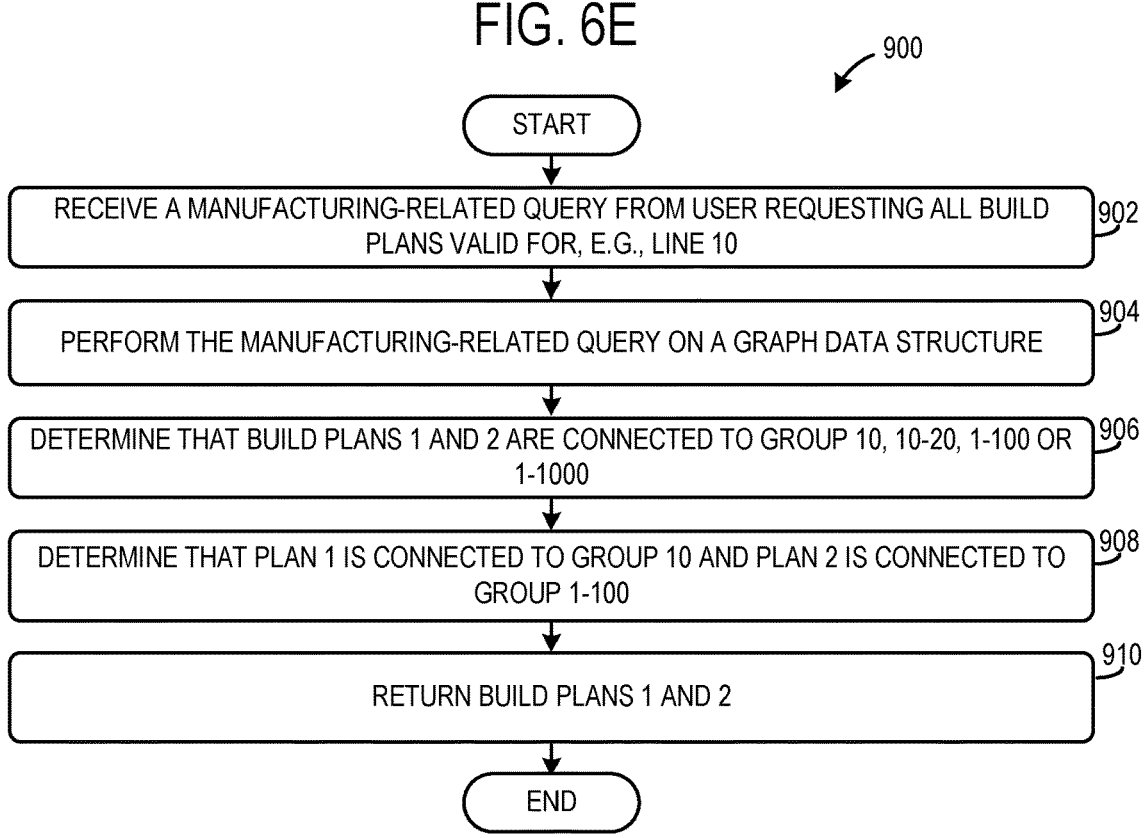
FIG. 6F shows an illustration of operations of a seventh method performed according to an example embodiment of the subject disclosure.

FIG. 6F illustrates a flow chart of an example configuration of a seventh method 900 according to one aspect of the subject disclosure. The following description of method 900 is provided with reference to the software and hardware components described above and shown in FIGS. 1-4B. It will be appreciated that method 900 also can be performed in other contexts using other suitable hardware and software components. The seventh method 900 is for performing a manufacturing-related query comprising a request for a determination of one or a plurality of objects that are valid for one or a plurality of line configurations and associated applicability groups specified by the user.

Figure 7F:
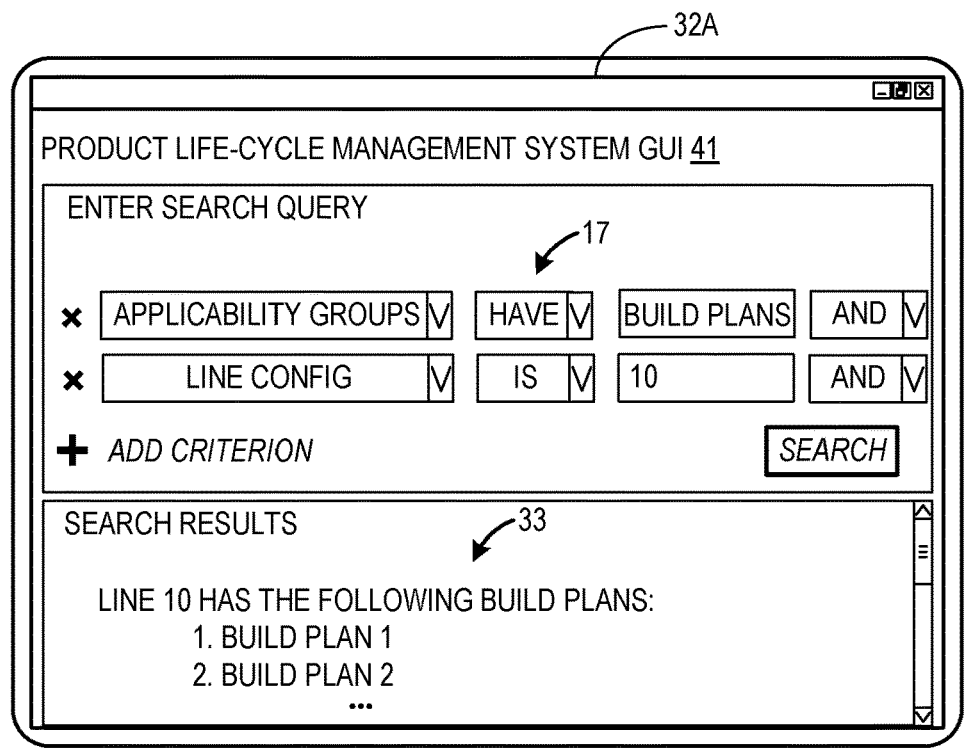
FIG. 7F shows an illustration of an exemplary graphical display of a query and query results associated with the seventh method performed according to an example embodiment of the subject disclosure.

At step 902, a manufacturing-related query is received from the user requesting all build plans that are valid for line 10, as illustrated in FIG. 7F. At step 904, the manufacturing-related query is performed on the graph data structure. At step 906, it is determined that build plans 1 and 2 are connected to group 10, 10-20, 1-100 or 1-1000. At step 908, it is determined that plan 1 is connected to group 10 and plan 2 is connected to group 1-100. At step 910, a response to the query is returned listing build plans 1 and 2, as illustrated in FIG. 7F.

As discussed above, a number of manufacturing-related queries can be conducted using applicability groups. These include: a manufacturing-related query comprising a request for a determination of whether an object is valid for a line configuration of the manufacturing line configurations and associated applicability groups specified by input data received from the user device, as performed in the fourth method 600 and fifth method 700; a manufacturing-related query comprising a request for a determination of whether an object is valid for a range of line configurations of the manufacturing line configurations and associated applicability groups specified by input data received from the user device, as performed in the sixth method 800; a manufacturing-related query comprising a request for a determination of one or more objects that are valid for one or a plurality of line configurations and associated applicability groups specified by input data received from the user device, as performed in the seventh method 900; and a manufacturing-related query comprising a request for a determination of all objects that are valid for an applicability group specified by the user, as performed in the second method 400 and the third method 500.

Queries such as those in methods 400 and 500, which are performed to return lists of all connected applicability groups, and in methods 600 to 800, which are performed to check if any relationships exist to determine validation, can be used in day-to-day planning and require efficient performance and minimal amounts of data storage since millions to hundreds of millions of objects can be linked. Queries such as those in method 900, which provide a pre-filtered list of all queried objects that are valid for a given line configuration, are common operations when releasing a build plan to the manufacturing floor, for example, and requires a coordinated effort between systems and a process effort to a ensure proper manufacturing line configuration. By making such queries faster and more efficient, the time required to switch between line configurations can be reduced from a weeklong process to a process that takes mere hours to complete.

The systems and processes described herein have the potential benefits of significant performance improvement on managing configuration data for a mixed manufacturing system by several orders of magnitude, enabling highly efficient customization of manufacturing products by design decisions and customer options, enabling a high degree of planning, enabling a higher degree of integration with any range of configurations, relating plan context to a given configuration, enabling real-time filtering of a configuration for a given line group, automating manufacturing plans based upon default options, and executing a high degree of data recording, metrics, time-studies and analysis for all the given plan configurations.

Further, the disclosure comprises embodiments according to the following clauses:

Clause 1. A product life cycle management system that is utilized in manufacturing a customizable manufactured article using one of a plurality of manufacturing line configurations, the system comprising: a processor configured to: store a graph data structure in memory, the graph data structure comprising a plurality of connected nodes, the connected nodes comprising one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related; receive a manufacturing-related query from a user device; perform the manufacturing-related query on the graph data structure;

determine one or more object-applicability group relationships based on the manufacturing-related query; and return a response to the manufacturing-related query based on the one or more object-applicability group relationships.

Clause 2. The product life cycle management system of clause 1, wherein the manufacturing-related query comprises a request for a determination of whether an object is valid for a line configuration of the manufacturing line configurations and associated applicability groups specified by input data received from the user device.

Clause 3. The product life cycle management system of any of clauses 1 or 2, wherein the manufacturing-related query comprises a request for a determination of whether an object is valid for a range of line configurations of the manufacturing line configurations and associated applicability groups specified by input data received from the user device.

Clause 4. The product life cycle management system of any of clauses 1 to 3, wherein the manufacturing-related query comprises a request for a determination of one or a plurality of objects that are valid for one or a plurality of line configurations of the manufacturing line configurations and associated applicability groups specified by input data received from the user device.

Clause 5. The product life cycle management system of any of clauses 1 to 4, wherein the objects further comprise at least one of manufacturing build plans, manufacturing assemblies, or manufacturing processes.

Clause 6. The product life cycle management system of any of clauses 1 to 5, wherein the applicability group nodes are organized in a hierarchical relationship that is traversable via a rooted tree.

Clause 7. The product life cycle management system of any of clauses 1 to 6, wherein the applicability group nodes are organized in a hierarchical relationship that is traversable via a nested set model.

Clause 8. The product life cycle management system of any of clauses 1 to 7, wherein at least one of the applicability groups represents an open-ended set of manufacturing line configurations.

Clause 9. The product life cycle management system of any of clauses 1 to 8, wherein the plurality of manufacturing line configurations are customized variations of the customizable manufactured article.

Clause 10. A method, comprising: receiving, by a system comprising a processor, a manufacturing-related query from a user device, wherein the manufacturing-related query is associated with a customizable manufactured article that utilizes one of a plurality of manufacturing line configurations; performing the manufacturing-related query on a graph data structure comprising a plurality of connected nodes, the connected nodes comprising one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related; determining one or more object-applicability group relationships based on the manufacturing-related query; and returning a response to the manufacturing-related query based on the one or more object-applicability group relationships.

Clause 11. The method of clause 10, wherein the manufacturing-related query comprises a request for a determination of whether an object is valid for a line configuration of the manufacturing line configurations and associated applicability groups.

Clause 12. The method of any of clause 10 or 11, wherein the manufacturing-related query comprises a request for a determination of whether an object is valid for a range of the manufacturing line configurations and associated applicability groups.

Clause 13. The method of any of clauses 10 to 12, wherein the manufacturing-related query comprises a request for a determination of one or a plurality of objects that are valid for one or a plurality of the manufacturing line configurations and associated applicability groups.

Clause 14. The method of any of clauses 10 to 13, wherein the objects further comprise at least one of manufacturing build plans, manufacturing assemblies, or manufacturing processes.

Clause 15. The method of any of clauses 10 to 14, wherein the applicability group nodes are organized in a hierarchical relationship that is traversable via a rooted tree.

Clause 16. The method of any of clauses 10 to 15, wherein the applicability group nodes are organized in a hierarchical relationship that is traversable via a nested set model.

Clause 17. The method of any of clauses 10 to 16, wherein at least one of the applicability groups represents an open-ended set of manufacturing line configurations.

Clause 18. The method of any of clauses 10 to 17, wherein the customizable manufactured article is an aircraft.

Clause 19. A method for manufacturing a customizable manufactured article using one of a plurality of manufacturing line configurations, the method comprising: receiving a manufacturing-related query from a user device; performing the manufacturing-related query on a graph data structure comprising a plurality of connected nodes, the connected nodes comprising one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related; determining one or more object-applicability group relationships based on the manufacturing-related query; returning responses to the manufacturing-related query based on the one or more object-applicability group relationships; and manufacturing the manufactured article based on the returned responses.

Clause 20. The method of clause 19, wherein the objects further comprise at least one of manufacturing build plans, manufacturing assemblies, or manufacturing processes.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein may define patentable subject matter apart from the disclosed examples and may find utility in other implementations not expressly disclosed herein.

To the extent that terms "includes," "including," "has," "contains," and variants thereof are used herein, such terms are intended to be inclusive in a manner similar to the term "comprises" as an open transition word without precluding any additional or other elements.

The invention claimed is:

1. A product life cycle management system that is utilized in manufacturing a customizable manufactured article using one of a plurality of manufacturing line configurations, the system comprising:
  a processor configured to:

store a non-relational graph data structure in memory, the graph data structure comprising a plurality of connected nodes, the connected nodes comprising one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related;

receive a manufacturing-related query from a user device;

perform the manufacturing-related query on the graph data structure;

determine one or more object-applicability group relationships based on the manufacturing-related query; and return a response to the manufacturing-related query based on the one or more object-applicability group relationships.

2. The product life cycle management system of claim 1, wherein
the manufacturing-related query comprises a request for a determination of whether an object is valid for a line configuration of the manufacturing line configurations and associated applicability groups specified by input data received from the user device.

3. The product life cycle management system of claim 1, wherein
the manufacturing-related query comprises a request for a determination of whether an object is valid for a range of line configurations of the manufacturing line configurations and associated applicability groups specified by input data received from the user device.

4. The product life cycle management system of claim 1, wherein
the manufacturing-related query comprises a request for a determination of one or a plurality of objects that are valid for one or a plurality of line configurations of the manufacturing line configurations and associated applicability groups specified by input data received from the user device.

5. The product life cycle management system of claim 1, wherein
the objects further comprise at least one of manufacturing build plans, manufacturing assemblies, or manufacturing processes.

6. The product life cycle management system of claim 1, wherein
the applicability group nodes are organized in a hierarchical relationship that is traversable via a rooted tree.

7. The product life cycle management system of claim 6, wherein
the plurality of manufacturing line configurations are customized variations of the customizable manufactured article.

8. The product life cycle management system of claim 1, wherein
the applicability group nodes are organized in a hierarchical relationship that is traversable via a nested set model.

9. The product life cycle management system of claim 1, wherein
at least one of the applicability groups represents an open-ended set of manufacturing line configurations.

10. A method, comprising:
receiving, by a system comprising a processor, a manufacturing-related query from a user device, wherein the manufacturing-related query is associated with a customizable manufactured article that utilizes one of a plurality of manufacturing line configurations;

performing the manufacturing-related query on a non-relational graph data structure comprising a plurality of connected nodes, the connected nodes comprising one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related;

determining one or more object-applicability group relationships based on the manufacturing-related query; and returning a response to the manufacturing-related query based on the one or more object-applicability group relationships.

11. The method of claim 10, wherein
the manufacturing-related query comprises a request for a determination of whether an object is valid for a line configuration of the manufacturing line configurations and associated applicability groups.

12. The method of claim 10, wherein
the manufacturing-related query comprises a request for a determination of whether an object is valid for a range of the manufacturing line configurations and associated applicability groups.

13. The method of claim 10, wherein
the manufacturing-related query comprises a request for a determination of one or a plurality of objects that are valid for one or a plurality of the manufacturing line configurations and associated applicability groups.

14. The method of claim 10, wherein
the objects further comprise at least one of manufacturing build plans, manufacturing assemblies, or manufacturing processes.

15. The method of claim 10, wherein
the applicability group nodes are organized in a hierarchical relationship that is traversable via a rooted tree.

16. The method of claim 15, wherein
at least one of the applicability groups represents an open-ended set of manufacturing line configurations.

17. The method of claim 15, wherein
the customizable manufactured article is an aircraft.

18. The method of claim 10, wherein
the applicability group nodes are organized in a hierarchical relationship that is traversable via a nested set model.

19. A method for manufacturing a customizable manufactured article using one of a plurality of manufacturing line configurations, the method comprising:
receiving a manufacturing-related query from a user device;

performing the manufacturing-related query on a non-relational graph data structure comprising a plurality of connected nodes, the connected nodes comprising one or more applicability group nodes for applicability groups representing the manufacturing line configurations and object nodes for objects representing components used in the manufacturing line configurations, the object nodes being connected to the one or more corresponding applicability group nodes to thereby encode in the graph data structure the manufacturing line configurations with which each object is related;

determining one or more object-applicability group relationships based on the manufacturing-related query;

returning responses to the manufacturing-related query based on the one or more object-applicability group relationships; and manufacturing the manufactured article based on the returned responses.

20. The method of claim 19, wherein the objects further comprise at least one of manufacturing build plans, manufacturing assemblies, or manufacturing processes.

* * * * *